United States Patent [19]

Israelson et al.

[11] Patent Number: 4,735,635
[45] Date of Patent: Apr. 5, 1988

[54] APPARATUS AND PROCESS FOR FILTERING HIGH TEMPERATURE GAS STREAMS

[75] Inventors: Gordon A. Israelson; Thomas E. Lippert, both of Murrysville Boro, Pa.; John A. Schwab, Knutsford, United Kingdom; David F. Ciliberti, Murrysville Boro, Pa.

[73] Assignee: Westinghouse Electric Corp., Pittsburgh, Pa.

[21] Appl. No.: 23,999

[22] Filed: Mar. 10, 1987

Related U.S. Application Data

[63] Continuation of Ser. No. 817,704, Jan. 10, 1986, abandoned.

[51] Int. Cl.$^4$ .................... B01D 39/20; B01D 46/24
[52] U.S. Cl. .......................................... 55/71; 55/96; 55/97; 55/302; 55/341 R; 55/374; 55/378; 55/498; 55/502; 55/507; 55/508; 55/509; 55/523
[58] Field of Search ................. 55/71, 96, 97, 283, 55/302, 341 R, 378, 379, 374, 498, 507, 508, 509, 502, 523

[56] References Cited

U.S. PATENT DOCUMENTS

| | | |
|---|---|---|
| Re. 24,954 | 3/1961 | Church ............................. 55/96 |
| 1,847,368 | 3/1932 | Wendler ......................... 55/97 X |
| 2,269,664 | 1/1942 | Hallerberg ..................... 55/502 X |
| 2,526,651 | 10/1950 | Garbo ............................ 55/523 X |
| 2,548,875 | 4/1951 | Degnen et al. ................. 55/523 X |
| 2,721,626 | 10/1955 | Rick ................................ 55/97 X |
| 2,769,506 | 11/1956 | Abboud ......................... 55/379 X |
| 3,055,745 | 9/1962 | Drummond et al. ........... 55/523 X |
| 3,073,097 | 1/1963 | Hallett et al. .................. 55/302 X |
| 3,325,979 | 6/1967 | Smith ............................. 55/96 X |
| 3,493,342 | 2/1970 | Weaver et al. .................. 55/71 X |
| 3,513,638 | 5/1970 | Young ........................... 55/341 R X |
| 3,710,552 | 1/1973 | Genton ......................... 55/341 R X |
| 4,073,632 | 2/1978 | Reinauer et al. .............. 55/302 X |
| 4,158,554 | 6/1979 | Bundy et al. .................. 55/508 X |
| 4,306,896 | 12/1981 | O'Dell ........................... 55/341 R |
| 4,343,631 | 8/1982 | Ciliberti ........................ 55/302 |
| 4,398,931 | 8/1983 | Shevlin .......................... 55/341 R |
| 4,474,587 | 10/1984 | Matsumoto et al. ........... 55/71 |

FOREIGN PATENT DOCUMENTS

| | | |
|---|---|---|
| 628115 | 9/1961 | Canada ......................... 55/97 |
| 59899 | 9/1982 | European Pat. Off. ........ 55/523 |
| 137021 | 10/1980 | Japan ............................ 55/523 |
| 6089816 | 7/1981 | Japan ............................ 55/283 |
| 724927 | 2/1955 | United Kingdom ........... 55/302 |
| 507337 | 8/1976 | U.S.S.R. ........................ 55/96 |
| 749406 | 7/1980 | U.S.S.R. ........................ 55/302 |

OTHER PUBLICATIONS

Reed, G. P., "How Hot Gas Cleaning Improves the Economics of Electricity-from-Coal," Filtration and Separation, Mar./Apr. 1984, pp. 120–124.

Moscardini, R. L. et al., "Comparison of High Temperature Gas Particulate Collectors for Low Level Radwaste Incinerator Volume Reduction Systems," Presented at Waste Management '83, Feb. 27–Mar. 3, 1983.

Primary Examiner—Kathleen J. Prunner
Attorney, Agent, or Firm—D. C. Abeles

[57] ABSTRACT

A filtering apparatus for separating particulates from a hot gas stream using hollow, tubular filter elements has a housing with a laterally extending support plate for the filter elements separating the housing into upper and lower sections. The tops of the filter elements are biased against the support plate and the bottoms thereof restrained from lateral movement by restraining rings. Blowback and purge gas systems provide for cleaning of the filter elements and maintenance of the blowback system clear of the solids or condensation products that might form during the separation. The apparatus is especially useful in filtering solids from a hot, corrosive gaseous stream, such as a zirconium tetrachloride process gas stream, where the gas stream contains gaseous constituents that are subject to condensation or solids formation during separation of the particulates and prior to discharge from the filtering apparatus.

10 Claims, 4 Drawing Sheets

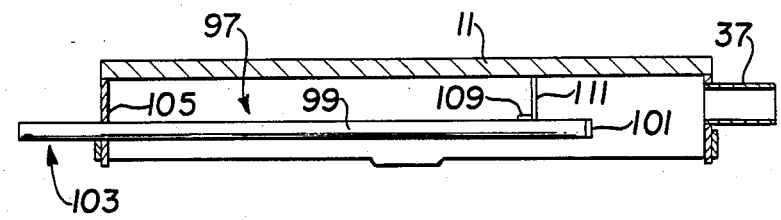
FIG. 9
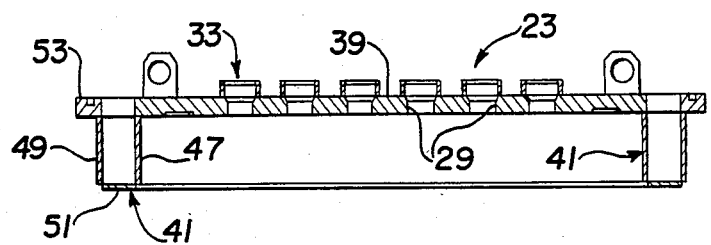
FIG. 4
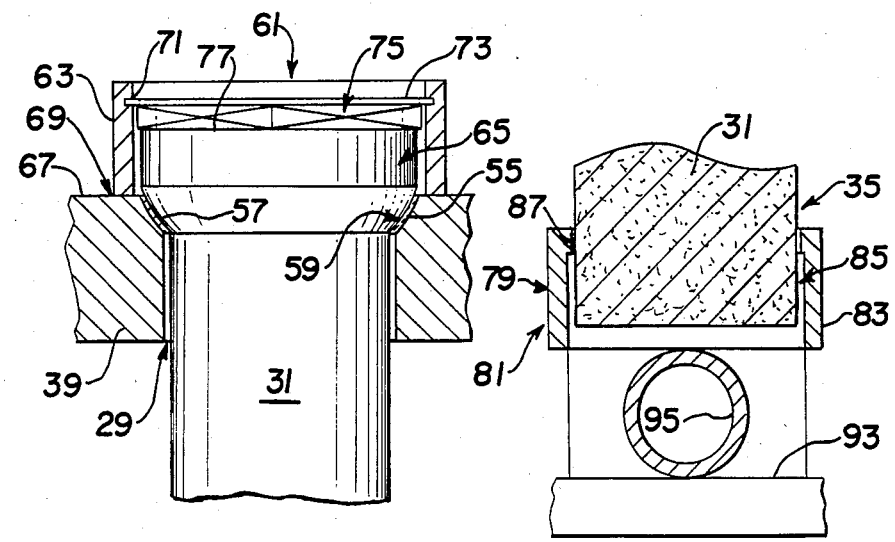
FIG. 5
FIG. 6

APPARATUS AND PROCESS FOR FILTERING HIGH TEMPERATURE GAS STREAMS

This application is a continuation of application Ser. No. 817,704 filed Jan. 10, 1986 and now abandoned.

FIELD OF THE INVENTION

The present invention relates to a filter apparatus and process for the separation of particulate material, and especially for the continuous separation of particulates from hot, corrosive gas streams.

BACKGROUND OF THE INVENTION

Many processes exist wherein a hot gaseous medium is produced which contains particulate material that must be separated from the gaseous medium, either to prevent pollution, to remove hazardous material, or to reclaim the particulates for further use. Numerous such processes use fluidized bed reactors which produce a hot, corrosive gaseous mixture from which particulate material must be removed.

In the formation of zirconium tetrachloride from zirconia sand, for example, a fluidized bed can be used to chlorinate zirconia and extract zirconium from zirconia sand. Zirconia sand and coke are fluidized by nitrogen and chlorine gases at low pressure and high temperature producing zirconium tetrachloride as the useful produce gas. As with all fluidized bed systems, some reactant is lost as small unreacted solid particulates of sand and coke are carried over by the process gas into downstream equipment. To minimize this reactant loss, the upper section of the reactor is usually enlarged in size to reduce process gas velocity which minimizes the particle size of particulates carried out of the reaction chamber. This enlarged section is called the disengagement section. To further improve operating efficiency, cyclones can be installed in or above the disengagement section. In the last ten years, a considerable amount of development effort has been expended developing an alternative to cyclones for control of particulates in high temperature fluid bed reactor processes.

One type of system for the removal of particulates from a hot gas stream is described in U.S. Pat. No. 4,343,631 to David F. Ciliberti, and is assigned to the assignee of the present invention. In that system, a compact, cross flow filter apparatus is described containing a plurality of relatively small cross flow ceramic filter elements or blocks, and ducts or tubes that are nested in an arrangement to form a high density filter system.

In place of block-like cross flow filter elements, it has been proposed in the prior art to use ceramic candle filter elements in high temperature gas filtration techniques. Such ceramic candles can be formed from silicon carbide or other ceramics which have mineral fiber flakes therein, and are hollow tubular elements, with the gas passed through the walls of the tubular elements, such that particulates collect on the outer walls, and the cleaned gas discharged from the hollow of the tubular member. Pulse, or blowback gas can be supplied from a plenum in a head of a vessel containing the candles to permit cleaning of portions of the candles in the vessel in sequence.

It is an object of the present invention to provide a filtering apparatus that uses hollow, tubular filter elements for the continuous filtering of solid particulate material from hot gas streams, particularly corrosive gas streams.

It is another object of the present invention to provide a filtering apparatus for use in continuous filtering particulate material from hot gas streams which contain gaseous constituents that are subject to condensation or solids formation during the separation of the particulate material through cooling of the gas stream below a particular temperature value.

SUMMARY OF THE INVENTION

An apparatus for filtering of particulates from a hot gas stream in a continuous manner through the use of hollow, tubular filter elements having an open top, where the gas stream is passed through the walls of the filter elements and clean gas discharged from the open top, with a blowback gas used to clean the filter elements, has a housing divided into upper and lower sections by a laterally extending divider, such as a support plate for the filter elements. The support plate is attached to the housing by means of laterally flexible connections. The hollow, tubular filter elements are supported in orfices in the support plate and the bottom of the filter elements restrained from lateral movement by restraining rings surrounding the bottom, while the filter elements are biased into contact with the support plate by a biasing means such as a pipe surrounding the open end of the filter element and a spring enclosed by the pipe bearing against the top of the hollow, tubular filter element. The blowback system includes a conduit with a gas port directed towards the open end of the filter element and a purge gas is passed through the conduit during normal operation of the filter apparatus to maintain the gas port and conduit clear.

The process enables the separation of particulate material from hot, gas streams that contain particulates and gaseous constituents that would condense or form solids during the separation unless high temperatures are maintained throughout the system, and is especially useful for separating solids from a zirconium tetrachloride formation process gaseous stream.

BRIEF DESCRIPTION OF THE DRAWINGS

FIG. 4 is a vertical cross-sectional view of the support plate and associated laterally flexible means attached thereto;

FIG. 5 is an enlarged view of the section of FIG. 2, enclosed by the circle, identified as V, drawn therein, of a hollow, tubular filter element biasing means connected to the support plate;

FIG. 6 is an enlarged view of the section of FIG. 2, encircled by the circle, identified as VI, drawn at the lower portion of FIG. 2, of the restraining means for the bottom of the hollow, tubular filter element;

FIG. 9 is a view, taken along lines IX—IX of FIG. 8, of a conduit and support therefor for a blowback and purge means of the present apparatus.

DETAILED DESCRIPTION

The present apparatus and process are usable in the continuous separation of particulate material from a hot gaseous stream using hollow, tubular filter elements, and is especially adapted for use with gaseous streams which contain gaseous constituents that are subject to condensation or solids formation during the separation, and prior to discharge from a filtering system, which would clog the system.

Figure 1:
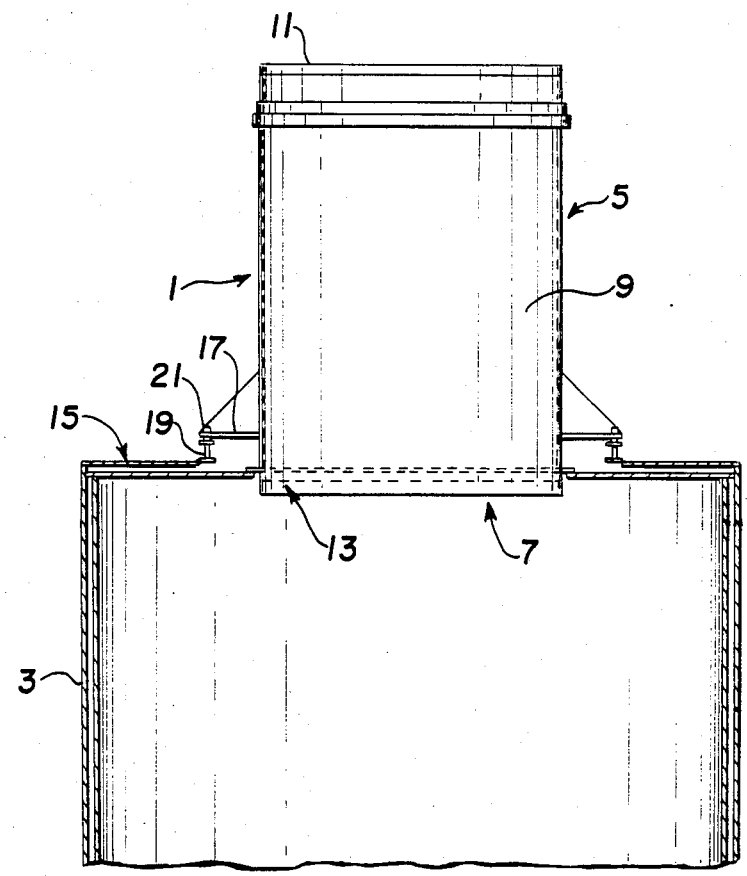
FIG. 1 is a vertical cross-sectional view of a housing of a filtering apparatus of the present invention mounted atop a reactor, such as a fluidized bed reactor.

Referring now to FIG. 1, the filter apparatus 1 of the present invention is shown mounted on a reactor vessel 3, such as a fluidized bed reactor, the filter apparatus comprising a housing 5 having a bottom open end 7, side walls, 9 and a closed top wall 11. The open end 7 of the housing is supported within an aperture 13 in the top wall 15 of the reactor vessel. Mounting of the filter apparatus 1 on the reactor vessel may be achieved by use of flanges 17 extending outwardly from the side wall 9 of the filter apparatus which rest on I-beam supports 19 atop the top wall 15 of the reactor vessel, with jack screws 21 provided for alignment of the filter apparatus relative to the reactor vessel.

Figure 2:
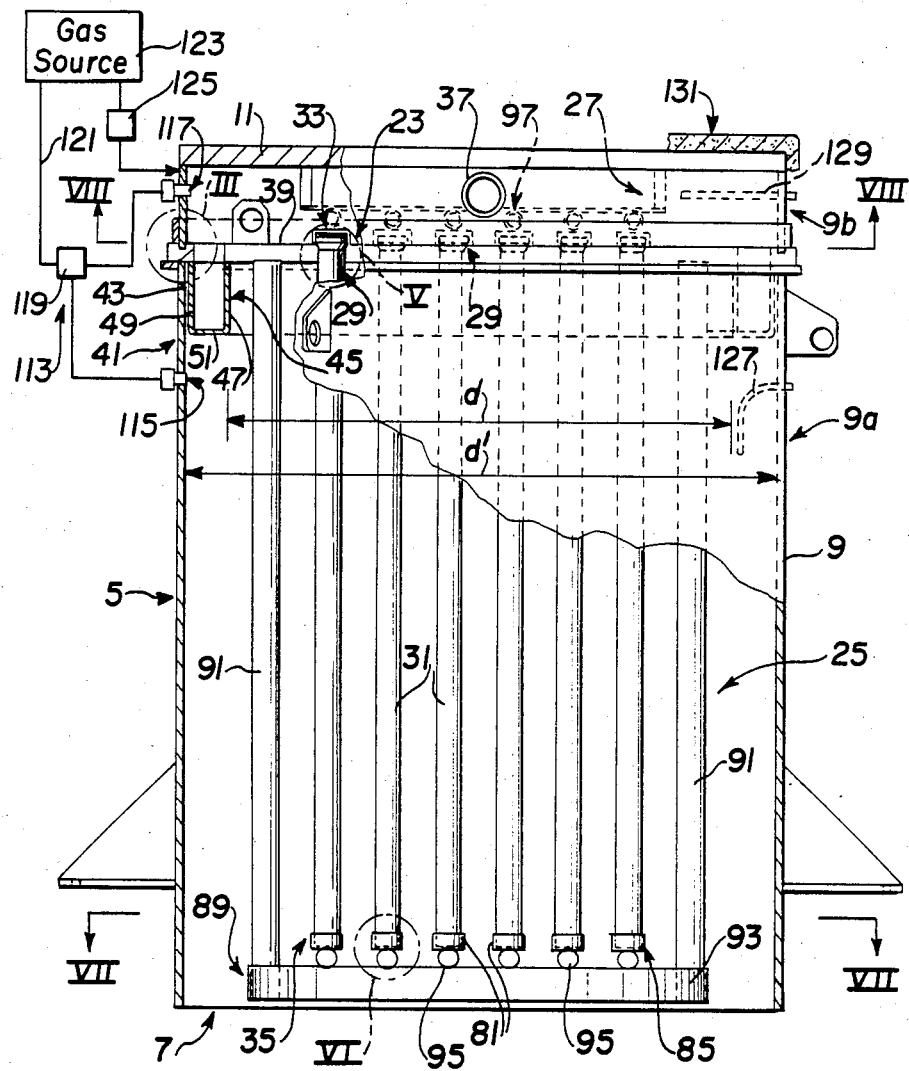
FIG. 2 is a vertical cross-sectional view of the filtering apparatus, with a portion of the housing wall intact, and schematically illustrating the purge and blowback gas source and controls.

Extending laterally across the interior space of the housing 5 is a dividing means 23, as illustrated in FIG. 2, which divides the housing into a lower section 25 and an upper section 27, and seals the sections from one another. The divider plate has means thereon, such as spaced orifices 29 for suspending a plurality of hollow, tubular filter elements 31, the hollow, tubular filter elements having an open end 33 and a closed bottom 35. The hollow, tubular filter elements, and bottom 35 thereof, extend into the lower section 25 of the housing 5, while the open end 33 communicates with the upper section 27 of the housing. In a preferred embodiment, the housing 5 has a cylindrical wall 9 and an array of filter elements 31 are provided in spaced rows, such as thirty-six filter elements in six parallel rows of six filter elements each. A vent 37 for discharge of gas from the top of the housing 5 is provided, which communicates with the upper section 27 of the housing.

The divider means 23 is preferably in the form of a support plate 39 having apertures 29 therein, the support plate 39 having a diameter d less than the interior diameter d' of the housing 5, with a laterally flexible means 41 connecting the support plate 39 to the inner surface 43 of the wall 9 of housing 5.

Figure 3:
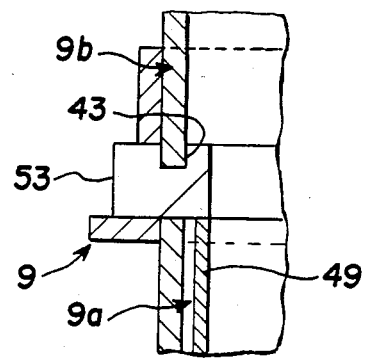
FIG. 3 is an enlarged view of the section of FIG. 2 encircled by the circle, identified as III, drawn at the upper left-hand corner of FIG. 2.

As illustrated, the laterally flexible means 41 is preferably a U-shaped ring member 45 having a pair of downwardly depending skirts 47 and 49 that are connected together by a closure plate 51 at the bottom of the pair of skirts. One of the pair of skirts, skirt 47 is attached to the perimeter of the support plate 39, and the other skirt 49 is attached to the inner surface 43 of the wall 9 of the filter housing. As illustrated (FIG. 3), the skirt 49 may be attached to a support block ring 53 which is inserted into the wall 9 and separates the wall into lower and upper sections 9a and 9b. The housing 5 and support block ring 53 are designed to be a seal welded together, and not in the nature of a gasketed, bolted closure. This design solves difficulties where corrosive gases, such as chlorine, are present in the housing, which are difficult to contain.

The support plate 39 and attached support block ring are best illustrated in FIG. 4, which shows the interconnecting laterally flexible means 41. Also, as illustrated therein, and in FIG. 5, the support plate 39 has, about the top edge of each of the orifices 29, for support of the hollow, tubular filter elements 31, a bevelled portion 55. The hollow, tubular filter elements have a complementary bevelled shoulder 57 at the outer surface of the upper end thereof, which seats in the bevelled portion 55, and a gasket 59 may be disposed therebetween. The hollow tubular filter elements 31 are biased into contact with the support plate 39 by biasing means 61, which comprises a pipe 63, attached to support plate 39, having an interior diameter larger than the exterior diameter of the top head portion 65 of the hollow, tubular filter element 31, the pipe 63 being attached to the upper surface 67 of the support plate, as indicated at 69, and surrounding the orifice 29. Pipe 63 has on its inner surface, a groove 71, into which a snap ring 73, open through its center, is engageable, with the snap ring retaining a biasing means such as a wave spring 75 between the snap ring 73 and top surface 77 of the hollow, tubular filter element 31. In this manner, the head portion 65 of the hollow, tubular filter element 31 is biased towards the gasket 59 on the bevelled portion 55 about orifice 29 in the support plate 39. The wave spring 75, held in place by snap ring 73, maintains a load on the hollow, tubular filter element 31 when the assembly is at a high temperature and the differential thermal growth between the hollow, tubular filter element 31 and the support plate 39 is greatest. This wave spring 75 also allows maintenance of proper seating of the shoulder 57 of the hollow, tubular filter element 31 against bevelled portion 55 when angular rotation of the upper head portion 65 in the orifice 29 occurs. In a sense, a ball-in-socket type of securement of the filter element 31 in the support plate is achieved.

Figure 7:
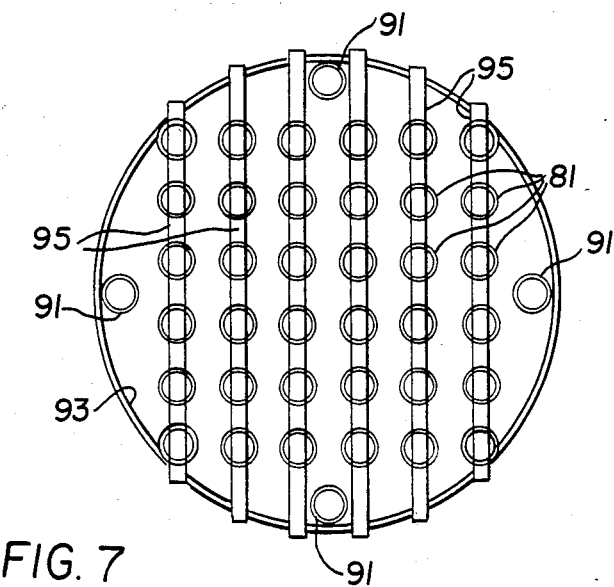
FIG. 7 is a plan view of the restraining means including the restraining rings and support columns and tubular members, for restraining the bottoms of the hollow tubular filter elements taken along line VII—VII of FIG. 2.

In addition to biasing the open top end 33 of the hollow, tubular filter element 31 into contact with the support plate 39, the closed bottom end 35 thereof is provided with restraining means 79 to prevent lateral movement of the bottom of the filter tube. The restraining means 79 (FIGS. 6 and 7) in the form of restraining rings 81 which surround the bottom end 35 of the hollow, tubular filter element 31, the wall 83 of the ring being spaced from the outer wall 85 of the hollow, tubular filter element 31. Preferably, the wall 83 of the restraining ring has an inwardly directed flange 87 which extends towards the surface 85 of the hollow, tubular filter element. The restraining rings 81 are supported in a capturing position relative to the bottom end 35 of the hollow, tubular filter element 31 by a brace 89 (FIG. 2) which comprises a plurality of columns 91 depending from the support plate 39 to below the bottom ends 35 of the hollow, tubular filter elements 31, which columns 91 have a bracing ring 93 attached adjacent the bottom thereof, with a plurality of tubular members 95 extending across the bracing ring 93 below the hollow, tubular filter elements 31. The restraining rings 81 are attached to, and spaced along the tubular members 95.

Figure 8:
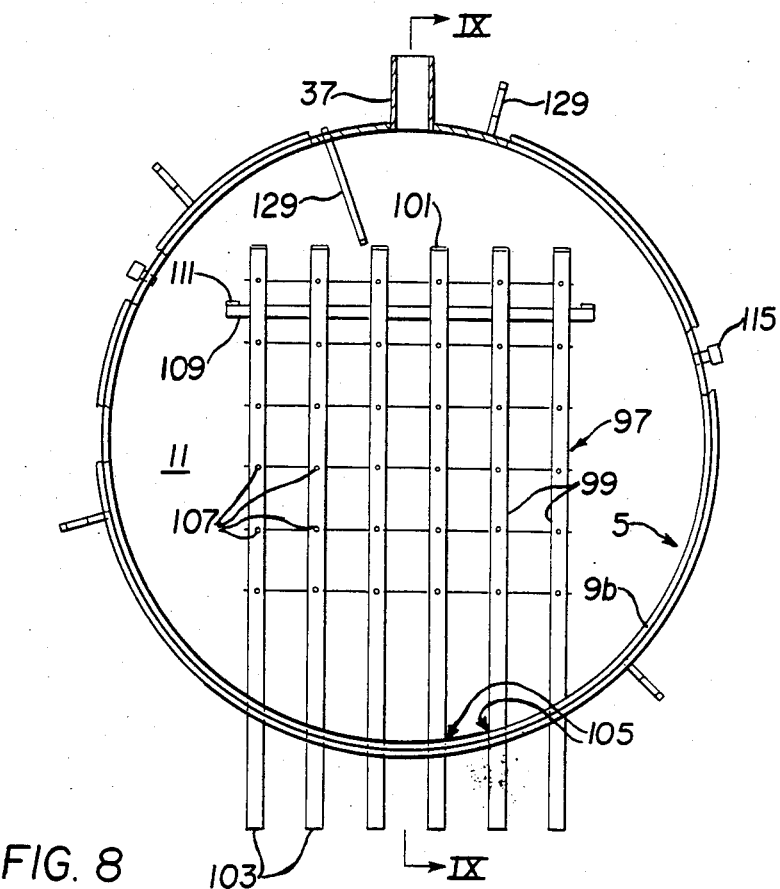
FIG. 8 is an underside view of the blowback and purge gas means connected to the upper section of the housing of the filtering apparatus of the present invention taken along line VIII—VIII of FIG. 2.

A blowback means 97 for passing a blowback gas into the open ends 33 of the hollow, tubular filter elements 31 so as to dislodge solids collected on the outer surface of those elements as illustrated in FIGS. 8 and 9, is provided in the upper section 27 of the housing 5. The blowback means 97 is illustrated as a plurality of tubular members or conduits 99 closed at one end 101 and open at the other end 103, which open end is connected to a source of pressurized gas. The conduits pass through apertures 105 in the wall 9b and extend across the open tops 33 of the hollow, tubular filter elements 31, with gas ports 107 provided, spaced along conduits 99 and directed towards said open tops 33. Preferably, the conduits are secured in position by connecting means such as a cross bar 109 extending across and attached to the conduits 99, which cross bar is secured to the top wall 11 of the housing by arms 111.

Pressure sensing means 113, such as pressure tap 115 in the lower section 25 of the housing 5 and pressure tap 117 in the upper section 27 of the housing 5 are provided through the wall portions 9a and 9b, which pressure taps are connected to pressure sensing control 119, the pressure sensing control 119 operatively associated through a lead 121 to a source of blowback gas 123. When the pressure sensing means 113 detects a predetermined pressure drop between the confines of lower section 25 relative to the confines of the upper section 27 of the housing 5, blowback gas is discharged through valve means (not shown), to conduits 99 and through ports 107 into the open tops 33 of hollow, tubular filter elements 31 to dislodge solids from the outer surface of the hollow, tubular filter elements 31 within lower sections 25 of the housing 5. Preferably, the hollow, tubular filter elements are subjected to a pulse of blowback gas in series, such that rows of hollow, tubular filter elements will be cleaned in succession, with the remaining rows continuing to act as a filter medium to provide for continuous operation of the filter apparatus.

Purge means 125 is also provided, in association with the source of blowback gas 123, to provide for a slow release of purge gas from the source of blowback gas 123 to maintain the conduits 99 and gas ports 107 free from contamination or plugging by solids. Thermocouple wells 127 and 129 are also provided through the wall sections 9a and 9b to sense the temperature within lower section 25 and upper section 27 of the housing 5. Heat control means such as electric heaters or insulation means 131 may also be provided about the housing 5.

The apparatus of the present invention is especially useful in filtering of hot, corrosive gases from processes wherein the gases carry particulates in a process gas stream. Continuous filtering of hot (350° C. or higher), corrosive, and temperature sensitive gases can be ensured. The blowback and purge gases are those which would not detrimentally effect the constituents of the gaseous stream being filtered and are preferably an inert gas such as nitrogen, or the like.

In a fluidized bed process wherein zirconia sand is chlorinated to extract zirconia therefrom, sand and coke are fluidized by nitrogen and chlorine gases at low pressure and high temperature producing zirconium tetrachloride as the useful product or process gas. Zirconium tetrachloride ($ZrCl_4$) has physical properties which require special temperature controls in a filtration unit for use with such a gas. The boiling temperature of $ZrCl_4$ is 437° C., and it sublimes from solid at 331° C. Consequently, in order to maintain $ZrCl_4$ gas inthe gaseous state, any filtration unit used to filter such a gas stream must be capable of operating at about 450° C. or higher. At lower temperatures, the condensation of liquid and solid formation would plug the filtering media.

Such a zirconium tetrachloride process gas stream would generally have a gas composition by volume of $ZrCl_4$-19%; $SiCl_4$-19%; CO-24%; $CO_2$-27%; $N_2$-10% and about 1% $Cl_2$. In using the present apparatus for filtering particulates from such a gas stream, the housing 5 would be supported on the disengagement section of a crude chlorinator reactor. An array of hollow, tubular filter elements, such as 6 rows of 6 each, or a total of 36 elements would be disposed in the support plate, with tubular filter elements of about 5.7 centimeters in diameter by about 1.5 meters in length used.

In order to enable filtering of a corrosive, high temperature and temperature dependent gas, such as a $ZrCl_4$ product gas, the present filter housing, dividing means, blowback conduits, and the like are formed from nickel or a high nickel-content alloy, and the hollow, tubular filter elements are comprised of a porous ceramic material such as sintered silicon carbide, while nitrogen or other inert gas, that would prevent solids formation in the system, is used as the purge and blowback gases. The hot, corrosive gas stream, at about 480° C., containing particulates enters the open end 7 of the filter housing 5, and surrounds and penetrates the hollow, tubular filter elements 31 leaving the particulate solids on the outside surface thereof. The filtered gas flows axially up the center of the hollow, tubular filter elements 31 into the upper section 27 of the filter housing 5. The filtered gas then flows out of nozzle or vent 37 for collection or use. After sufficient particulate buildup on the outer surfaces of the hollow, tubular filter elements 31, such that a predetermined pressure differential, such as a pressure differential of about 0.35 to 1.1 pounds per square inch, is effected between lower section 25 and upper section 27 of the filter housing 5, the blowback gas is passed through conduits 99 and gas ports 107 back through the hollow, tubular filter elements 31, dislodging the accumulated particulate solids therefrom. Nitrogen would preferably be used as the blowback gas and also as the purge gas, which continually exits through gas ports 107, to prevent the introduction of oxygen or water into the filter system. Subsequent formation of zirconium oxide $ZrO_2$ (melting point 2700° C.) and $ZrO_2$ $xH_2O$ (melting point 550° C.) by contact with oxygen or water could cause plugging of the hollow, tubular filter elements. To prevent $ZrCl_4$ solid formation and plugging of the blowback gas ports, the continuous nitrogen purge gas would be heated above 450° C.

The restraining, rings 81, as aforedescribed, have a small clearance or spacing between the rings 81 and the bottom outer surface 85 of the hollow, tubular filter elements 31. A spacing of about 0.25–0.3 centimeters would be suitable, in such a system where particulates collected on the hollow, tubular filter elements are on the order of up to about 200 micrometers in diameter, with those particulates dislodged on blowback and portion thereof falling to the spacing between rings 81 and the bottom outer surface 85. After a few blowback cycles, a portion of the particulate solids will bridge this clearance and act as a vibration dampening means or motion snubber. At this time, the hollow, tubular filter elements 31 will be supported at both the top and bottom which reduces the filter susceptibility to fatigue failure.

The present apparatus and process thus enable the continuous separation of particulate material from a hot, corrosive and/or temperature sensitive gas stream using hollow, tubular filter elements, with support of the filter element from above and dampening of the bottom of the filter elements. In the event that a filter element does not backflush uniformly, symmetrically cleaned surfaces will have varying resistance to gas flow. By providing support for the bottom of the filter elements, the present invention prevents subsequent backflushes from producing a net force to one side leading to a susceptibility to fatigue failure of the filter element. The apparatus is provided with differential pressure activated inert gas blowback flushing of the filter elements and uses a heated inert gas continuous purge of the blowback system. A ball-in-socket type of support for the filter elements is provided to accommodate thermal warpage of the support, while the use of back flushed particulates serves as a vibration dampener. The support plate is also provided with a concentric skirt portion which minimizes stresses and distortion due to thermal expansion.

What is claimed is:

1. In an apparatus for filtering of particulates from a particulate-containing high temperature gas stream wherein the gas stream is passed through the walls of a hollow, tubular filter element having an outer wall and clean gas discharged from an open end of the filter element and particulates collected on the outer wall thereof, with means provided to pass a blowback gas into the open end of the filter element to discharge collected particulate material from the outer wall thereof and clean the same, the improvement comprising:

a housing, having a wall with an inner surface and an interior diameter, and having a lower section with an open bottom and an upper closed section having a discharge vent therein;
   means extending laterally across said housing for dividing said housing and sealing the same into said upper and lower sections comprising a support plate having a plurality of orifices therethrough in which a plurality of the hollow, tubular filter elements are suspended, said support plate having a diameter less than the interior diameter of the housing;
   laterally flexible means connecting the support plate to the inner surface of the wall of the housing, comprising a U-shaped ring member formed from a pair of downwardly depending skirts, one of said pair of skirts connected to the support plate and the other of said skirts connected to the wall of the housing, with a closure plate connecting said two skirts together at the bottom thereof;
   means on said dividing means for suspending said plurality of said hollow, tubular filter elements such that the same extend into said lower section of the housing with the open ends thereof communicating with the upper section of the housing; and
   means within said lower section of the housing for restraining the bottoms of said filter elements from lateral movement, whereby a particulate-containing high temperature gas stream passed into said lower section of the housing passes through the hollow, tubular filter elements into said upper section and clean gas is discharged through said discharge vent.

2. The apparatus as defined in claim 1 wherein a support block ring is provided on the wall of said housing and said other skirt is attached to said support block ring.

3. In an apparatus for filtering of particulates from a particulate-containing high temperature gas stream wherein the gas stream is passed through the walls of a hollow, tubular filter element having an open top and an outer wall and clean gas discharged from the open top of the filter element and particulates collected on the outer wall thereof, with means provided to pass a blowback gas into the open top of the filter element to discharge collected particulate material from the outer wall thereof and clean the same, the improvement comprising:

a housing having a lower section with an open bottom and an upper closed section having a discharge vent therein;
   a filter element support plate, having a plurality of orifices therethrough, extending laterally across said housing for dividing said housing and sealing the same into said upper and lower sections;
   means on said support plate for suspending a plurality of said hollow, tubular filter elements through the orifices thereof, such that the same extend into said lower section of the housing with the open tops thereof communicating with the upper section of the housing, said support plate having a bevelled portion about the top edge of each of said orifices and each of said hollow, tubular filter elements having a complementary bevelled shoulder about the open top thereof which nests in said bevelled portion;
   a gasket disposed between each bevelled portion of the support plate and the complementary bevelled shoulder of said hollow, tubular filter elements;
   biasing means provided on the support plate to bias each of the complementary bevelled shoulders of said hollow, tubular filter elements into contact with the bevelled portions of the support plate;
   means within said lower section of the housing for restraining the bottoms of said filter elements from lateral movement, whereby a particulate-containing high temperature gas stream passed into said lower section of the housing passes through the hollow, tubular filter elements into said upper section and clean gas is discharged through said discharge vent.

4. The apparatus as defined in claim 3 wherein said biasing means comprises a pipe surrounding each open top of the hollow, tubular filter elements, a snap ring disposed above each of the open tops of said hollow, tubular filter elements within said pipe, and spring means disposed between each said snap ring and said hollow, tubular filter elements.

5. The apparatus as defined in claim 4 wherein said spring means comprises a wave spring.

6. A process for separating particulate material from a particulate-containing hot stream of zirconium tetrachloride gas, which contains gaseous constituents that are subject to condensation or solids formation during said separation comprising:

passing said particulate-containing hot stream of zirconium tetrachloride gas into a housing having separated upper and lower sections, said gas being passed into the lower section of said filter housing having ceramic, hollow, tubular filter elements therein, which ceramic, hollow, tubular filter elements each have an outer surface and an open top;
   passing said hot stream of zirconium tetrachloride gas through said ceramic, hollow, tubular filter elements whereby solid particulates collect on the outer surfaces thereof and a filtered gas stream is discharged from the open tops of said ceramic, hollow, tubular filter elements into the separated upper section of the filter housing and discharged therefrom;

sensing the pressure within said lower section and said upper section of the filter housing to determine a pressure differential therein caused by collection of said solid particulates on the outer surfaces of the ceramic, hollow, tubular filter elements in said lower section;

periodically dislodging, upon sensing of a predetermined pressure differential, said particulate solids from the ceramic, hollow, tubular filter elements by passage of a blowback gas through said ceramic, hollow tubular filter elements from the open tops thereof, through ports in conduits spaced from the open tops of said ceramic, hollow, tubular filter elements, and a pressurized gas is continually passed through said ports to prevent ingress of said zirconium tetrachloride gas thereto; and maintaining the temperature of the upper section and lower section of said filter housing at a temperature in excess of about 450° C. to prevent condensation or solids formation of said gaseous constituents in the hot zirconium tetrachloride gas stream.

7. The process as defined in claim 6 wherein said blowback gas and said pressurized gas comprise nitrogen.

8. The process as defined in claim 7 wherein said ceramic, hollow, tubular filter elements are formed from silicon carbide.

9. The process as defined in claim 8 wherein said filter housing and conduits are of a metal selected from the group consisting of nickel and a high nickel-containing alloy.

10. In an apparatus for filtering of particulates from a particulate-containing high temperature gas stream wherein the gas stream is passed through the walls of a hollow, tubular filter element having a bottom edge and an outer wall and clean gas discharged from an open end of the filter element and particulates collected on the outer wall thereof, with means provided to pass a blowback gas into the open end of the filter element to discharge collected particulate material from the outer wall thereof and clean the same, the improvement comprising:

a housing, having a wall with an inner surface and an interior diameter, and having a lower section with an open bottom and an upper closed section having a discharge vent therein;

means extending laterally across said housing for dividing said housing and sealing the same into said upper and lower sections comprising a filter element support plate having a plurality of orifices therethrough in which a plurality of the hollow, tubular filter elements are suspended, said support plate having a diameter less than the interior diameter of the housing;

laterally flexible means connecting the support plate to the inner surface of the wall of the housing, comprising a U-shaped ring member formed from a pair of downwardly depending skirts, one of said pair of skirts connected to the support plate and the other of said skirts connected to the wall of the housing, with a closure plate connecting said two skirts together at the bottom thereof;

means on said dividing means for suspending said plurality of said hollow, tubular filter elements such that the same extend into said lower section of the housing with the open ends thereof communicating with the upper section of the housing; and means within said lower section of the housing for restraining the bottoms of said filter elements from lateral movement, comprising restraining rings surrounding the bottom edge of said hollow, tubular filter elements, said rings mounted in position by a brace, said brace comprising a plurality of columns depending from the support plate, a bracing ring attached to the columns, and tubular members extending across the bracing ring beneath the hollow tubular elements, with said restraining rings resting on said tubular members, said restraining rings having walls spaced from the outer wall of the hollow, tubular filter elements and an upper flange extending inwardly towards said hollow, tubular filter elements, whereby a particulate-containing high temperature gas stream passed into said lower section of the housing passes through the hollow, tubular filter elements into said upper section and clean gas is discharged through said discharge vent.

* * * * *